US012764654B2

(12) United States Patent
He et al.

(10) Patent No.: US 12,764,654 B2
(45) Date of Patent: Oct. 13, 2026

(54) IMPLICIT POWER SAVING OPERATIONS FOR A NETWORK-CONTROLLED REPEATER (NCR) IN WIRELESS COMMUNICATIONS

(71) Applicant: Apple Inc., Cupertino, CA (US)

(72) Inventors: Hong He, San Jose, CA (US); Dawei Zhang, Saratoga, CA (US); Seyed Ali Akbar Fakoorian, San Diego, CA (US); Jie Cui, San Jose, CA (US); Wei Zeng, Saratoga, CA (US); Ankit Bhamri, Bad Nauheim (DE); Haitong Sun, Cupertino, CA (US); Chunhai Yao, Beijing (CN); Chunxuan Ye, San Diego, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 608 days.

(21) Appl. No.: 18/202,753

(22) Filed: May 26, 2023

(65) Prior Publication Data

US 2024/0040500 A1 Feb. 1, 2024

Related U.S. Application Data

(60) Provisional application No. 63/394,230, filed on Aug. 1, 2022.

(51) Int. Cl.
*H04W 52/02* (2009.01)
*H04B 7/155* (2006.01)

(52) U.S. Cl.
CPC .... *H04W 52/0203* (2013.01); *H04B 7/15507* (2013.01)

(58) Field of Classification Search
CPC ............. H04W 52/02; H04W 52/0203; H04W 52/0209; H04W 52/0225; H04W 52/0261;
(Continued)

(56) References Cited

U.S. PATENT DOCUMENTS

2021/0377852 A1* 12/2021 Zhou ................. H04W 52/0235
2022/0201516 A1 6/2022 Guo et al.

FOREIGN PATENT DOCUMENTS

WO WO 2021022201 A1 2/2021
WO WO 2022150550 A1 7/2022

OTHER PUBLICATIONS

International Search Report and Written Opinion directed to related International Application No. PCT/US2023/071062, mailed Nov. 20, 2023; 11 pages.

(Continued)

*Primary Examiner* — Keith Ferguson
(74) *Attorney, Agent, or Firm* — Sterne, Kessler, Goldstein & Fox P.L.L.C.

(57) ABSTRACT

Some embodiments include a system, apparatus, article of manufacture, method, and/or computer program product and/or combinations and sub-combinations thereof, for implicit power saving operations for a network-controlled repeater (NCR) in a wireless network. Some embodiments include an NCR that can receive a Downlink Control Information (DCI) format including a first Physical Downlink Control Channel (PDCCH) monitoring periodicity, $K_{S1}$, and operate in an On-state for a duration of $K_{S1}$. The NCR can detect a skipped PDCCH monitoring periodicity, and operate in an Off-state for a duration corresponding to the skipped PDCCH monitoring periodicity. In some embodiments, the NCR operates with a carrier component (CC) with unpaired spectrum supporting slot configurations time division duplex (tdd)-uplink (UL)-downlink (DL)-ConfigurationCommon or tdd-UL-DLConfigurationDedicated. The NCR can detect from a System Information Block (SIB), a flexible orthogonal frequency division multiplexing (OFDM) symbol, and operate in an Off-state for a duration of the flexible OFDM symbol.

20 Claims, 8 Drawing Sheets

(58) Field of Classification Search
CPC ........... H04W 52/0274; H04W 52/028; H04W 52/0229; H04W 52/0235; H04B 7/15507; H04B 7/15; H04B 7/14
See application file for complete search history.

(56) References Cited

OTHER PUBLICATIONS

Samsung: “LI/L2 signaling for side control information”, 3GPP Draft; R1-2203922, 3rd Generation Partnership Project (3GPP) I Mobile Competence Centre I 650, Route Des Lucioles I F-06921 Sophia-Antipolis Cedex France II vol. RAN WG1, No. e-Meeting; May 9, 2022 2022052029 Apr. 2022 (Apr. 29, 2022), XP052143995, Retrieved from the Internet: URL:https://ftp.3gpp.org/tsg_ran/wG1_RL1/TSGR1_109-e/Docs/R1-2203922.zip R1-2203922 NCR_signaling.docx [retrieved on Apr. 29, 2022]; 6 pages.

* cited by examiner

IMPLICIT POWER SAVING OPERATIONS FOR A NETWORK-CONTROLLED REPEATER (NCR) IN WIRELESS COMMUNICATIONS

CROSS-REFERENCE TO RELATED APPLICATIONS

This application claims benefit of U.S. Provisional Application No. 63/394,230, filed on Aug. 1, 2022, entitled, Implicit Power Saving Operations for a Network-Controlled Repeater (NCR) in Wireless Communications, which is incorporated herein by reference in its entirety.

BACKGROUND

Field

The described embodiments relate generally to power saving operations for a network-controlled repeater (NCR) in a wireless communications system.

Related Art

Wireless communications systems support performance of an amplify-and-forward radio frequency (RF) repeater in a wireless communications system between a base station (BS) and a communications device such as a user equipment (UE). NR Network-controlled Repeaters are described in the 3rd Generation Partnership Project (3GPP) TR 38.867.

SUMMARY

Some embodiments include a system, apparatus, article of manufacture, method, and/or computer program product and/or combinations and sub-combinations thereof, for implicit power saving operations for a network-controlled repeater (NCR) in a wireless network. Some embodiments include an NCR that can receive a Downlink Control Information (DCI) format including a first Physical Downlink Control Channel (PDCCH) monitoring periodicity, $K_{S1}$, including an integer number of slots, and operate in an On-state for a duration of $K_{S1}$ based at least on the DCI format. The NCR can detect a skipped PDCCH monitoring periodicity subsequent to $K_{S1}$, and operate in an Off-state for a duration corresponding to the skipped PDCCH monitoring periodicity.

In some embodiments, the NCR operates in frequency range 2 (FR2) where a first orthogonal frequency division multiplexing (OFDM) symbol paired with beamforming information corresponds to an On-state for a duration of the first OFDM symbol within a second PDCCH monitoring periodicity, $K_{S2}$. The NCR can detect a second OFDM symbol without beamforming information pairing in the second PDCCH monitoring periodicity, $K_{S2}$, and operate in an Off-state for a duration of the second OFDM symbol. In some embodiments, the NCR operates with a carrier component (CC) with unpaired spectrum and supports slot configurations time division duplex (tdd)-uplink (UL)-downlink (DL)-ConfigurationCommon or tdd-UL-DL-ConfigurationDedicated. The NCR can detect from a System Information Block (SIB) of a third PDCCH monitoring periodicity, a flexible OFDM symbol, and operate in an Off-state for a duration of the flexible OFDM symbol.

In some embodiments, the NCR is not configured to receive from or forward to a user equipment (UE), a signal for $X_{gapOFF}$ time units, where the $X_{gapOFF}$time units>=$Y_{OFF}$, and where $Y_{OFF}$ corresponds to a duration for turning off an NCR-Forward (Fwd) component of the NCR at an access link communicatively coupled to the UE. The NCR can operate the NCR-Fwd component at the access link in an Off-state for a duration of the $Y_{OFF}$ time units.

In some embodiments, the NCR is configured to receive from or forward to a UE, one or more non-contiguous signals in a second PDCCH monitoring periodicity, $K_{S2}$, where a maximum gap between any of the one or more signals is less than $X_{gapON}$ time units, and operate an NCR-Fwd component of the NCR at an access link communicatively coupled to the UE, in an On-state for a duration of $Y_{ON}$ time units of $K_{S2}$. In some embodiments, $X_{gapOFF}$ time units represent a duration when the NCR is not configured to receive or forward a signal to the UE, and the $X_{gapON}$ time units equals the $X_{gapOFF}$ time units, the NCR can operate in an Off-state for a duration of $Y_{OFF}$ time units of $K_{S2}$.

In some embodiments, the NCR includes an NCR-mobile termination (MT) component and an NCR-Fwd component, where the NCR-MT component and the NCR-Fwd component are communicatively coupled. When the NCR-MT component at a control link uses a different type of radio frequency (RF) component than that of the NCR-Fwd component at a back haul link, the NCR can operate an On-Off state of the NCR-MT component at the control link independently from an On-Off state of the NCR-Fwd component at the back haul link. In some examples, the NCR can determine that the NCR-Fwd component is not configured to receive or forward a signal to a network for $X_{gapOFF}$ time units, where $X_{gapOFF}$ time units>=$Y_{OFF}$, where $Y_{OFF}$ corresponds to a duration for turning off the NCR-Fwd component communicatively coupled to the network. The NCR can operate the NCR-Fwd component at the backhaul link in an Off-state for a duration of the $Y_{OFF}$ time units based at least on the determination. In some examples, the NCR can determine that the NCR-Fwd component is configured to receive from, or forward to a network via the backhaul link, one or more non-contiguous signals in a second PDCCH monitoring periodicity, $K_{S2}$, where a maximum gap between any of the one or more signals is less than $X_{gapON}$ time units. The NCR can operate the NCR-Fwd component at the backhaul link in an On-state for a duration of $Y_{ON}$ time units of $K_{S2}$, based at least on the determination.

In some examples, the NCR can determine that the NCR-MT component is not configured to receive or forward a signal to a network for $X_{gapOFF}$ time units, where $X_{gapOFF}$ time units>=$Y_{OFF}$, where $Y_{OFF}$ corresponds to a duration for turning off the NCR-MT component communicatively coupled to the network. The NCR can operate the NCR-MT component in an Off-state for a duration of the $Y_{OFF}$ time units, based at least on the determination. In some examples, the NCR can determine that the NCR-MT component is configured to receive from, or forward to a network via the control link, one or more non-contiguous signals in a second PDCCH monitoring periodicity, $K_{S2}$, where a maximum gap between any of the one or more signals is less than $X_{gapON}$ time units. The NCR can operate the NCR-MT component in an On-state for a duration of $Y_{ON}$ time units of $K_{S2}$, based at least on the determination.

In some embodiments, when the NCR-MT component communicates with a network via a control link with a same type of RF component as the NCR-Fwd component communicates with the network via a backhaul link, the NCR can operate the NCR-MT component in a same On-Off state as the NCR-Fwd component. The NCR can determine that the NCR-Fwd and NCR-MT components are not configured to receive from or forward to a network, a signal for $X_{gapOFF}$ time units, where $X_{gapOFF}$ time units>=$Y_{OFF}$, where $Y_{OFF}$ corresponds to a duration for turning off the NCR-Fwd and NCR-MT functions. The NCR can operate the NCR-Fwd and NCR-MT components in an Off-state for a duration of the $Y_{OFF}$ time units based at least on the determining. In some examples the NCR can determine that the NCR-Fwd and NCR-MT components are configured to receive from or forward to a network, one or more non-contiguous signals in a second PDCCH monitoring periodicity, $K_{S2}$, where a maximum gap between any of the one or more signals is less than $X_{gapON}$ time units. The NCR can operate the NCR-Fwd and NCR-MT components in an On-state for a duration $Y_{ON}$ time units of $K_{S2}$.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
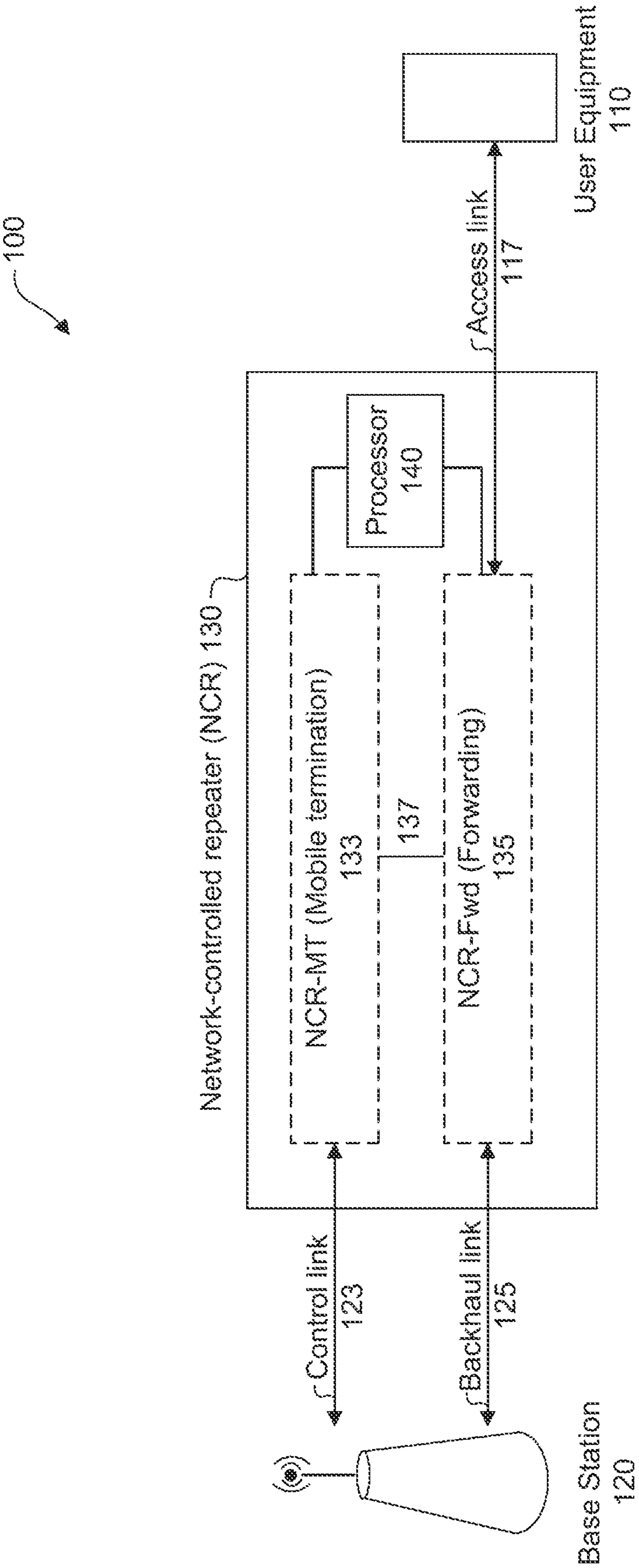
FIG. 1 illustrates an example system for implicit power saving operations for a network-controlled repeater (NCR), in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include a system, apparatus, article of manufacture, method, and/or computer program product and/or combinations and sub-combinations thereof, for implicit power saving operations for a network-controlled repeater (NCR) in a wireless network. Cellular network deployments provide wireless access coverage, and different types of network nodes are employed to enable wide area service coverage. Having full-stack cells is desirable, but that may not be always possible (e.g., backhauls may not be available or the solution may not be economically viable.) To improve the performance of an NCR, amplify-and-forward radio frequency (RF) repeater side control information can include On-Off information for efficient interference management and improved energy efficiency. Some embodiments include an implicit indication for power saving operations.

FIG. 1 illustrates an example system for implicit power saving operations for a network-controlled repeater (NCR), in accordance with some embodiments of the disclosure. System 100 includes user equipment (UE) 110, base station (BS) 120, and network-controlled repeater (NCR) 130. NCR 130 can include an NCR-mobile termination (NCR-MT) 133 and NCR-forwarding (NCR-Fwd) 135 connected via link 137. UE 110 may be a computing electronic device such as a smart phone, cellular phone, and for simplicity purposes—may include other computing devices including but not limited to laptops, desktops, tablets, personal assistants, routers, monitors, televisions, printers, and appliances. BS 120 can include but is not limited to a wireless base station, an enhanced node BS (eNB), a fifth generation new radio BS (gNB), or a transmission and reception point (TRP) of a wireless network. NCR 130 exchanges information with BS 120 via control link 123 and/or backhaul link 125.

NCR-MT 133 can be a functional entity that communicates with BS 120 via a Control link (C-link) 123 to enable the information exchanges (e.g. side control information). C-link 123 can be based on a new radio Uu interface. The side control information (SCI) can include instructions for controlling NCR-Fwd 135. In some examples, the SCI can be included in a Downlink Control Information (DCI) format. NCR-Fwd 135 can be a functional entity that performs the amplify-and-forwarding of uplink (UL) and/or downlink (DL) RF signals between BS 120 via backhaul link 125, and between UE 110 via access link 117. The behavior of NCR-Fwd 135 can be controlled according to the received SCI from BS 120 over C-link 123. In some embodiments, the SCI can include explicit and/or implicit On-Off information received by NCR-MT 133 that NCR 130 uses to control NCR-Fwd 135 via link 137, for efficient interference management with neighboring cells and reduced power consumption that results in improved energy efficiency. In some embodiments, NCR 130 can implicitly determine power saving operations for efficient interference management with neighboring cells and reduced power consumption that results in improved energy efficiency of NCR 130. In some embodiments, NCR-MT 133 and NCR-Fwd 135 can be communicatively coupled to processor 140.

Figure 2:
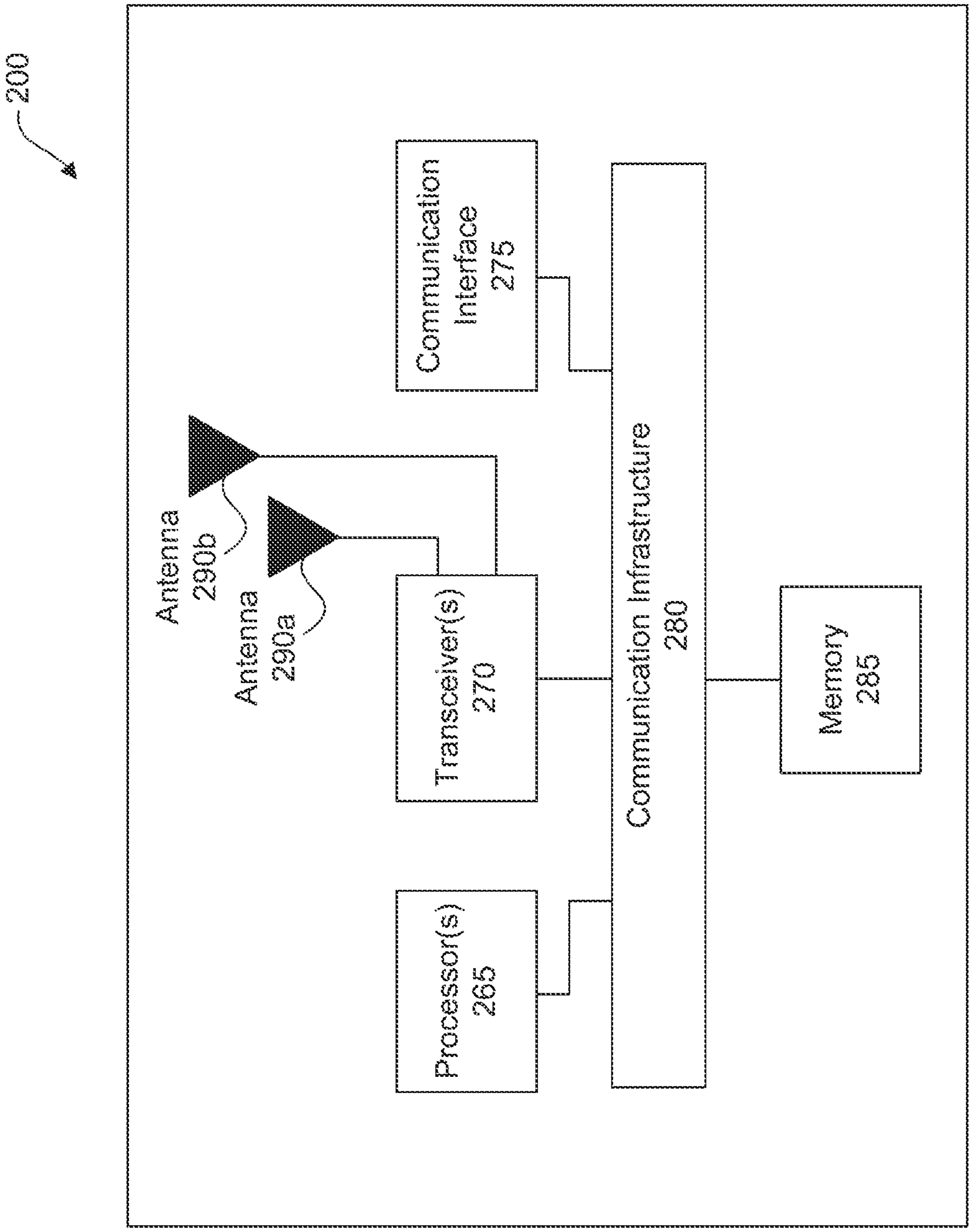
FIG. 2 illustrates a block diagram of an example wireless system for implicit power saving operations for an NCR, according to some embodiments of the disclosure.

FIG. 2 illustrates block diagram of an example wireless system 200 for implicit power saving operations for an NCR, according to some embodiments of the disclosure. For explanation purposes and not a limitation, FIG. 2 may be described with reference to elements from FIG. 1. For example, system 200 may be any of the electronic devices: UE 110, BS 120, or NCR 130 of system 100. In some examples, processors 265 may correspond to processor 140 of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications supporting implicit power saving operations for an NCR described herein. In some embodiments, one or more processors 265 can be "hard coded" to perform the functions described herein. Transceiver(s) 270 transmits and receives wireless communications signals including wireless communications supporting implicit power saving operations for an NCR according to some embodiments, and may be coupled to one or more antennas 290 (e.g., 290*a*, 290*b*). In some embodiments, a transceiver 270*a* (not shown) may be coupled to antenna 290*a* and different transceiver 270*b* (not shown) can be coupled to antenna 290*b*. Communication interface 275 allows system 200 to communicate with other devices that may be wired and/or wireless. Communication infrastructure 280 may be a bus. Antenna 290 may include one or more antennas that may be the same or different types.

Figure 3:
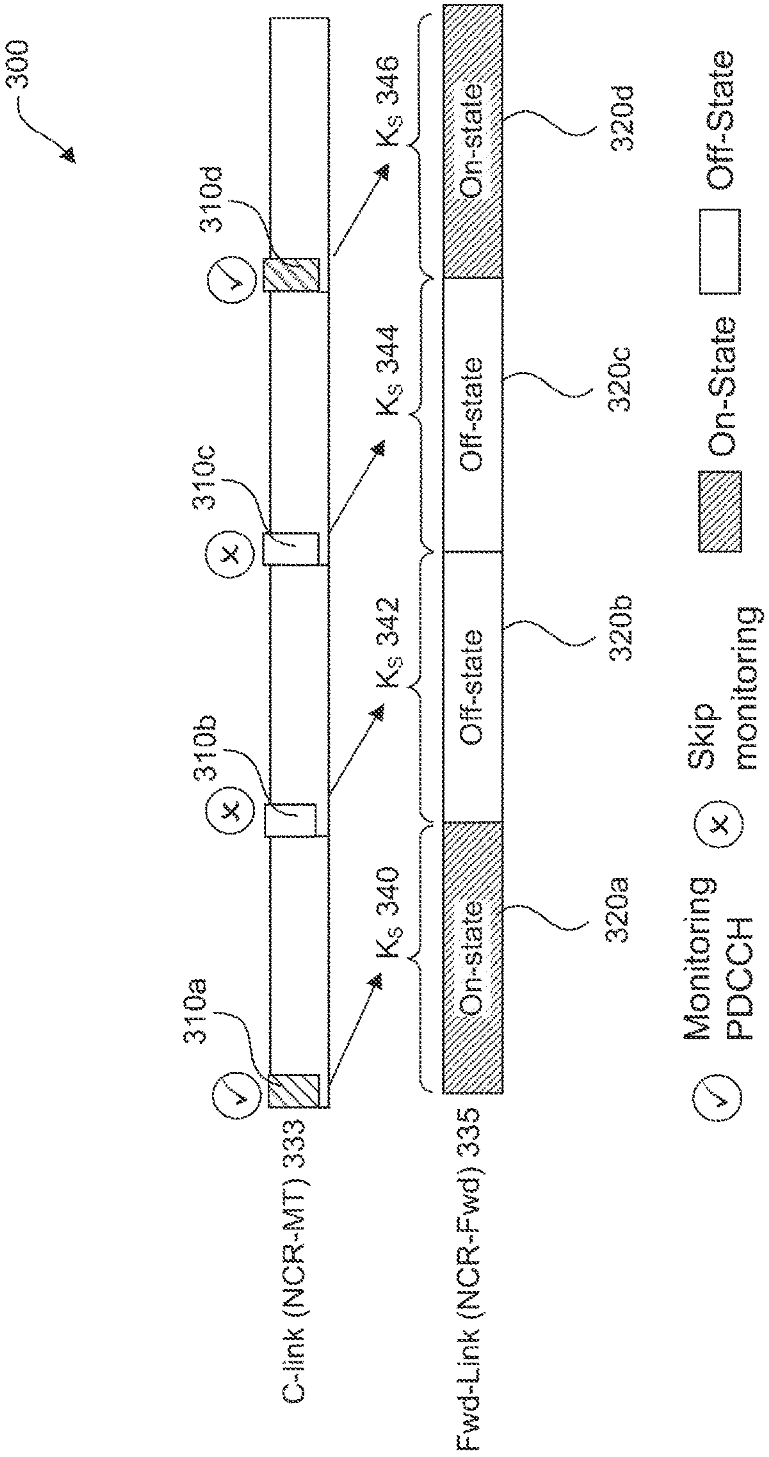
FIG. 3 illustrates an example of implicit power saving operations for an NCR, according to some embodiments of the disclosure.

FIG. 3 illustrates example 300 of implicit power saving operations for an NCR, according to some embodiments of the disclosure. For explanation purposes and not a limitation, FIG. 3 may be described with reference to elements from other figures within the disclosure. For example, portions of example 300 can be generated by BS 120, and processed by NCR 130 that includes NCR-MT 133 and NCR-Fwd 135 of FIG. 1, or system 200 of FIG. 2. Example 300 illustrates an implicit power saving operation for NCR 130 that can include NCR-MT 133 communicating with BS 120 via C-link 333 and NCR-Fwd 135 communicating on Fwd-link 335. As an example, Fwd-link 335 can represent communications with BS 120 via backhaul link 125 and/or with UE 110 via access link 117.

In example 300, NCR-MT 133 supports implicit power saving operations on C-link 333, where NCR 130 can assume an Off-state for the associated NCR-Fwd 135, namely, Fwd-link 335 link when an associated Physical Downlink Control Channel (PDCCH) monitoring periodicity (e.g., monitoring occasion (MO)), $K_S$, is skipped. In some examples, $K_S$ includes one or more slots. A slot can include 14 orthogonal frequency division multiplexing (OFDM) symbols, where a symbol can transmit data in the uplink (UL) or downlink (DL) directions. In example 300, NCR-MT 133 can receive Downlink Control Information (DCI) format 310*a* via C-link 333 where DCI format 310*a* identifies PDCCH MO $K_S$ 340 as receiving and/or forwarding signals. Accordingly, NCR-Fwd 135 can remain in an On-state 320*a* for the corresponding PDCCH MO, $K_S$ 340, for transmission of data via Fwd-link 335 (e.g., via backhaul link 125 to BS 120 and/or via access link 117 to UE 110.)

When NCR-MT 133 determines that no DCI formats are received at 310*b* or 310*c*, NCR-MT 133 determines that there are no signals in PDCCH MOs $K_S$ 342 and $K_S$ 344 to be received and/or forwarded, and PDCCH MOs $K_S$ 342 and $K_S$ 344 are skipped. Accordingly, NCR-MT 133 can inform NCR-Fwd 135 (e.g., via link 137) and/or NCR 130 to enter an Off-state shown as Off-states 320*b* and 320*c* for a duration of PDCCH MOs $K_S$ 342 and $K_S$ 344, to save power. In the Off-state, NCR-Fwd 135 and/or components of NCR-Fwd 135 (e.g., component at backhaul link 125 or component at access link 117) can enter a sleep mode or power save mode to reduce power consumption.

When NCR-MT 133 receives DCI format 310*d* via C-link 333, where DCI format 310 identifies PDCCH MO $K_S$ 346 as receiving and/or forwarding signals, NCR-MT 133 can cause NCR-Fwd 135 to enter an On-state shown as 320*d* for the corresponding PDCCH MO $K_S$ 346 for transmission of data via Fwd-link 335 (e.g., via backhaul link 125 to BS 120 and/or via access link 117 to UE 110.)

In some embodiments, NCR 130 can receive DCI format 310*a* including a first PDCCH monitoring periodicity, $K_S$ 340, and operate in On-state 320*a* for a duration of $K_S$ 340 based at least on DCI format 310*a*. NCR 130 can detect a skipped PDCCH monitoring periodicity (e.g., $K_S$ 342) subsequent to $K_S$ 340, and operate in Off-state 320*b* for a duration corresponding to skipped PDCCH monitoring periodicity, $K_S$ 342.

Figure 4:
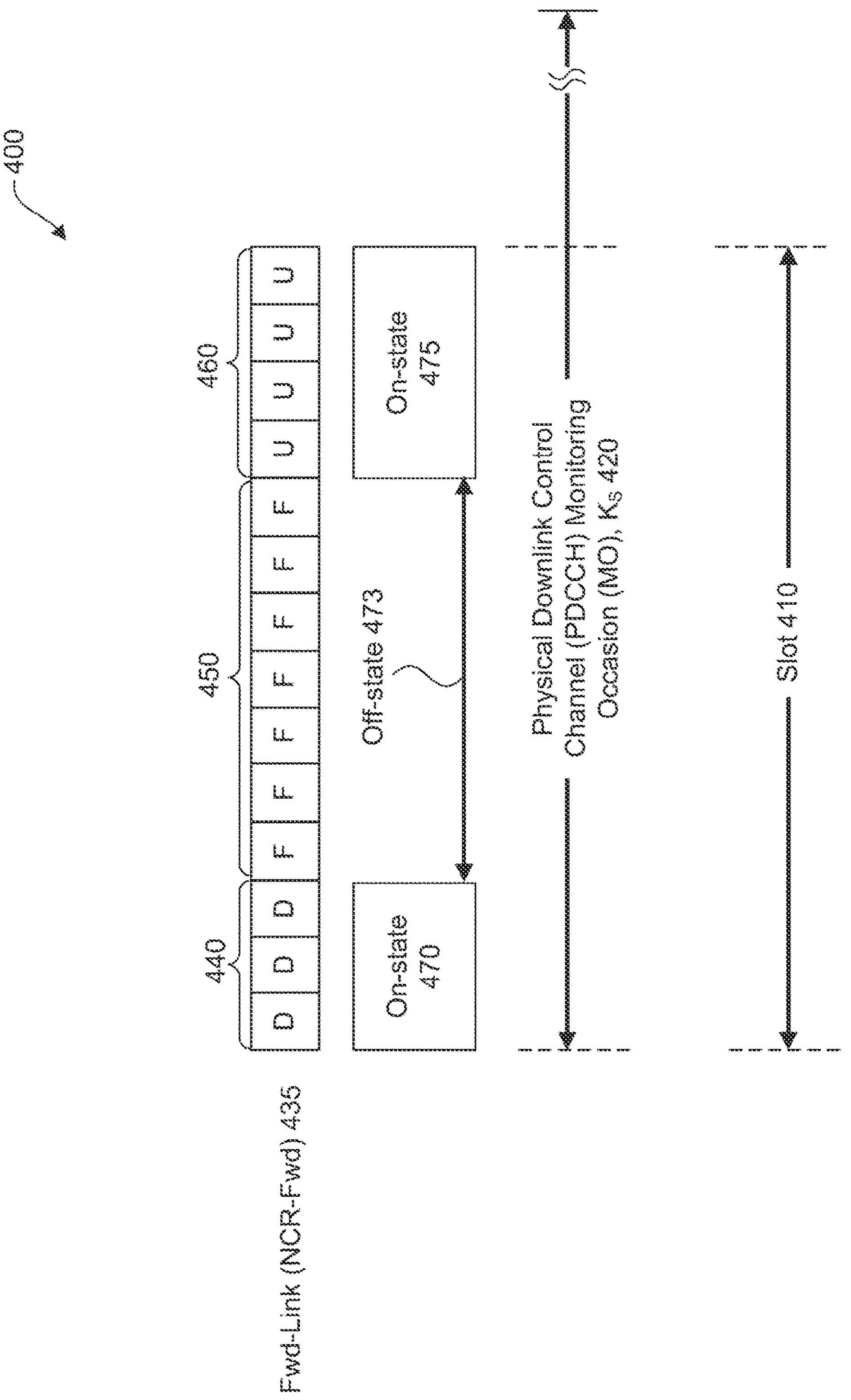
FIG. 4 illustrates another example of implicit power saving operations for an NCR, according to some embodiments of the disclosure.

FIG. 4 illustrates example 400 of implicit power saving operations for an NCR, according to some embodiments of the disclosure. For explanation purposes and not a limitation, FIG. 4 may be described with reference to elements from other figures within the disclosure. For example, portions of example 400 can be generated by BS 120, and processed by NCR 130 that includes NCR-MT 133 and NCR-Fwd 135 of FIG. 1, or system 200 of FIG. 2. In example 400, NCR 130 can operate with a component carrier (CC) with unpaired spectrum operation that support slot configurations such as time division duplex (tdd)-uplink (UL)-downlink (DL)-ConfigurationCommon or tdd-UL-DL-ConfigurationDedicated. In some examples, the slot configurations support OFDM symbols that can be indicated as flexible. When NCR 130 determines one or more flexible OFDM symbols (e.g., detecting from a System Information Block (SIB)), NCR 130 can implicitly enter an Off-state (e.g., sleep or power saving mode) for a duration of the one or more flexible (F) OFDM symbols. In some embodiments, NCR 130 places NCR-Fwd 135 in an Off-state for a duration corresponding to the one or more flexible (F) OFDM symbols detected to avoid forwarding operations that utilize power (e.g., forwarding one or more flexible OFDM symbols.)

In example 400, NCR 130 can determine from a SIB, that slot 410 within PDCCH MO $K_S$ 420 includes DL OFDM symbols 440, flexible (F) OFDM symbols 450, and UL OFDM symbols 460. Accordingly, or NCR-Fwd 135 may enter On-state 470 for a duration corresponding to DL OFDM symbols 440, Off-state 473 for a duration corresponding to flexible (F) OFDM symbols 450, and On-state 475 for a duration corresponding to UL OFDM symbols 460. NCR-Fwd 135 can forward or receive signals via Fwd-link 435 during On-state 470 and On-state 475.

In some embodiments, NCR 130 operates with CC with unpaired spectrum and supports slot configurations tdd-UL-DL-ConfigurationCommon or tdd-UL-DLConfiguration-Dedicated. NCR 130 can detect from a SIB of a second PDCCH monitoring periodicity, $K_{S2}$ (e.g., $K_S$ 420), one or more flexible (F) OFDM symbols, and operate in an Off-state 473 for a duration of the one or more flexible (F) OFDM symbols.

In some examples, NCR 130 operates in frequency range 2 (FR2), and an On-state duration of an On-Off Pattern (OOP) can be paired with beam information. For example, NCR 130 can detect one or more OFDM symbols without beamforming information, and enter an Off-state corresponding to the one or more OFDM symbols without beamforming information. In some embodiments, NCR 130 operates in FR2 and a first OFDM symbol paired with beamforming information corresponds to an On-state OFDM symbol duration within $K_{S1}$. NCR 130 can detect a second OFDM symbol without beamforming information pairing in a second PDCCH monitoring periodicity, $K_{S2}$, and operate in an Off-state for a duration of the second OFDM symbol.

Figure 5A:
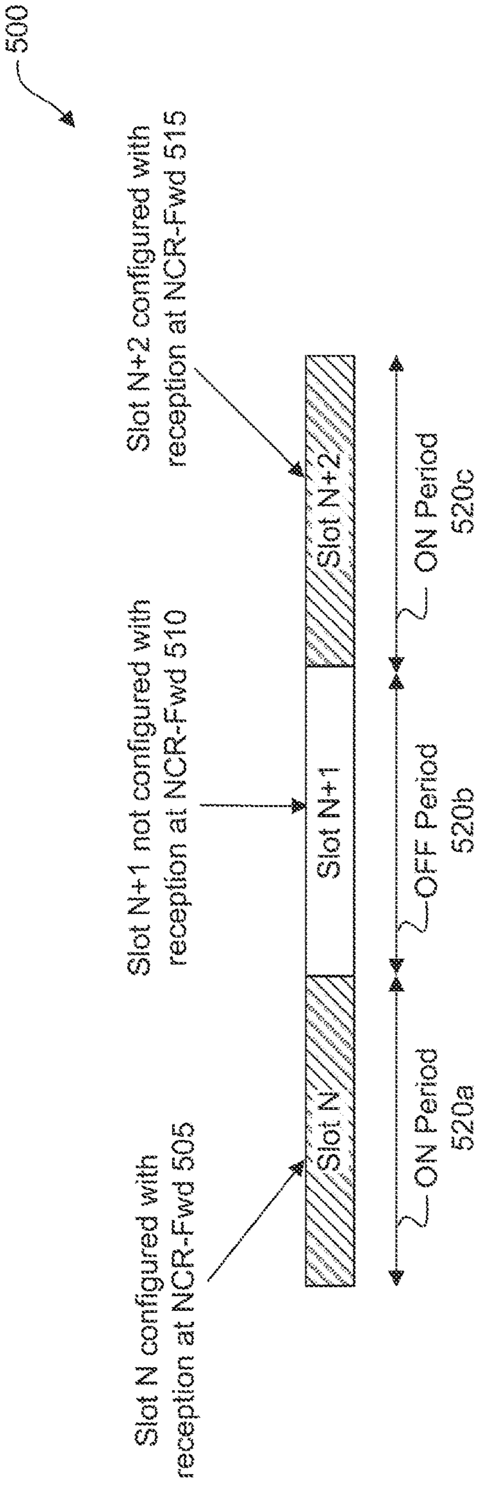
FIG. 5A illustrates another example of implicit power saving operations for an NCR, according to some embodiments of the disclosure.

FIG. 5A illustrates example 500 of implicit power saving operations for an NCR, according to some embodiments of the disclosure. For explanation purposes and not a limitation, FIG. 5A may be described with reference to elements from other figures within the disclosure. For example, portions of example 500 can be generated by BS 120, and processed by NCR 130 that includes NCR-MT 133 and NCR-Fwd 135 of FIG. 1, or system 200 of FIG. 2. NCR 130 can autonomously turn OFF NCR-Fwd 135 function/component at access link 117 for $Y_{OFF}$ time units if there is a duration of at least $X_{gapOFF}$ time units for which NCR-Fwd 135 is not configured to receive from or forward to UE(s) 110, on any channel or signal, where $X_{gapOFF} \geq Y_{OFF}$. In some examples, $Y_{OFF}$ can represent a time granularity at a symbol level or slot level for the time NCR 130 takes to turn off RF components (e.g., 1 time unit can equal to 1 OFDM symbol.) In example 500, $X_{gapOFF}=Y_{OFF}=1$ slot. NCR 130 determines that slot N 505 is configured for reception of signals at NCR-Fwd 135, and NCR 130 can place NCR-Fwd 135 in an On-state for ON period 520*a* corresponding to slot N. NCR 130 can determine that slot N+1 510 is not configured for reception of signals at NCR-Fwd 135, and $X_{gapOFF}=Y_{OFF}=1$ slot satisfies the condition that $X_{gapOFF}>=Y_{OFF}$. Accordingly, NCR 130 can autonomously place NCR-Fwd 135 in an Off-state for $Y_{OFF}$ time unit of 1 slot, shown as OFF period 520*b*. In some embodiments, NCR 130 can autonomously place NCR-Fwd 135 in an Off-state for $X_{gapOFF}$ time units where $X_{gapOFF}$ is greater than $Y_{OFF}$. NCR 130 can determine that slot N+2 515 is configured for reception of signals at NCR-Fwd 135, and can place NCR-Fwd 135 in an On-state for ON period 520*c*.

Figure 5B:
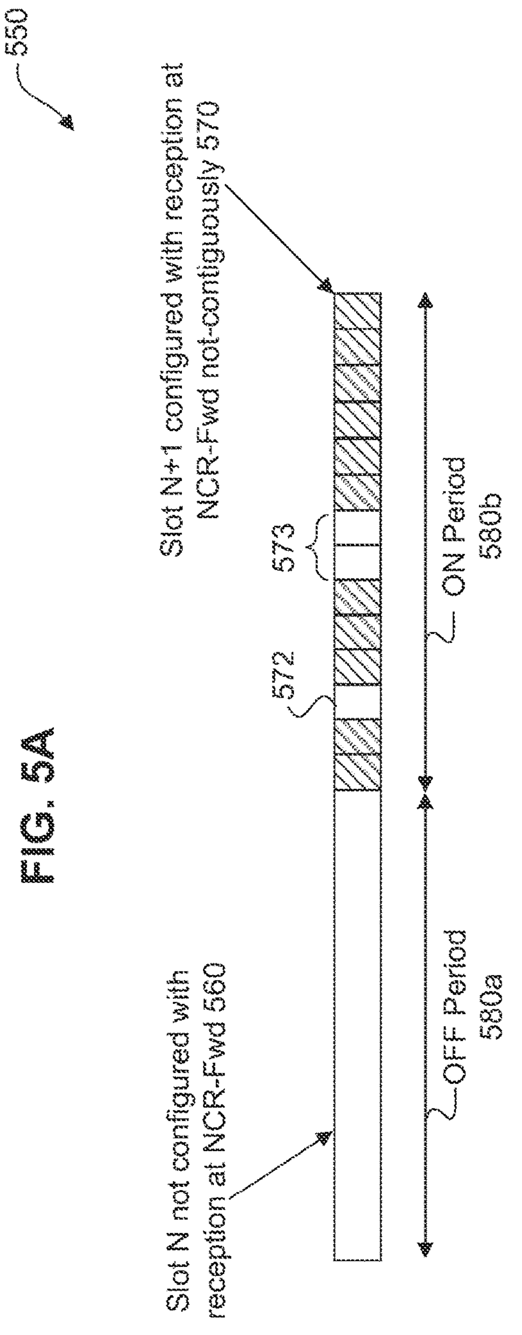
FIG. 5B illustrates another example of implicit power saving operations for an NCR, according to some embodiments of the disclosure.

FIG. 5B illustrates example 550 of implicit power saving operations for an NCR, according to some embodiments of the disclosure. For explanation purposes and not a limitation, FIG. 5B may be described with reference to elements from other figures within the disclosure. For example, portions of example 550 can be generated by BS 120, and processed by NCR 130 that includes NCR-MT 133 and NCR-Fwd 135 of FIG. 1, or system 200 of FIG. 2. NCR 130 can autonomously turn ON NCR-Fwd 135 (e.g., function or component) at access link 117 for $Y_{ON}$ time units, if NCR-Fwd 135 is configured/indicated to receive/forward one or multiple contiguous and/or non-contiguous channel/signal from/to UE(s) 110, where the maximum gap between non-contiguous transmissions (if any) is not more than $X_{gapON}$. In example 550, $X_{gapON}=4$ OFDM symbols and $Y_{ON}=14$ OFDM symbols. NCR 130 can determine that slot N 560 is not configured with reception at NCR-Fwd 135, so NCR 130 can place NCR-Fwd 135 in an Off-state as shown by OFF period 580*a*. Slot N+1 570 is configured with reception at NCR-Fwd 135 with non-contiguous transmissions where gap 572=1 OFDM symbol and gap 573=2 OFDM symbols are each less than $X_{gapON}=4$ OFDM symbols. Accordingly, NCR 130 can keep NCR-Fwd 135 in an On-state for a duration of $Y_{ON}=14$ OFDM symbols shown as ON period 580*b*, even though the transmissions on a forwarding link (e.g., backhaul link 125 and/or access link 117) are non-contiguous. In an example, when $X_{gapOFF}=X_{gapON}$, NCR 130 can keep NCR-FWD in an Off-state for a duration of $Y_{OFF}$.

When different RF components or different types of RF components are used for NCR-MT 133 at Control link 123 and NCR-Fwd 135 at backhaul link 125, the On-Off-state of NCR-Fwd 135 can be set independently from the On-Off-state of NCR-MT-133. In some embodiments, NCR 130 can autonomously turn OFF the NCR-Fwd 135 function/component at backhaul link 125 and/or NCR-Fwd 135 function/component at access link 117 for Y OFF time units, based on the conditions defined. For example, if there is a duration of at least $X_{gapOFF}$ time units for which NCR-Fwd 135 is not configured/indicated to receive/forward any channel/signal from/to a wireless network (e.g., BS 120), where $X_{gapOFF}>=Y_{OFF}$, NCR 130 can autonomously turn OFF the NCR-Fwd 135 function/component at backhaul link 125 and/or NCR-Fwd 135 function/component at access link 117 for $Y_{OFF}$ time units. (See FIG. 5A.)

NCR 130 can autonomously turn ON NCR-Fwd 135 function/component at backhaul link 125 and/or NCR-Fwd 135 function/component at access link 117 for $Y_{ON}$ time units based on the conditions defined. For example, when NCR-Fwd is configured/indicated to receive/forward one or multiple contiguous and/or non-contiguous channel/signal from/to network, where the maximum gap between non-contiguous transmissions (if any) is not more than $X_{gapON}$ (e.g., less than or equal to $X_{gapON}$), NCR 130 can autonomously turn ON NCR-Fwd 135 function/component at backhaul link 125 and/or NCR-Fwd 135 function/component at access link 117 for $Y_{ON}$ time units. (See FIG. 5B.)

In some embodiments, NCR 130 can autonomously turn OFF NCR-MT 133 function/component for $Y_{OFF_{MT}}$ time units, if there is a duration of at least $X_{gapOFF_{MT}}$ time units for which NCR-MT 133 is not configured/indicated to monitor/transmit any channel/signal from/to the network, where $X_{gapOFF_{MT}}>=Y_{OFF_{MT}}$. In some embodiments, NCR 130 can autonomously turn ON the NCR-MT 133 function/component for $Y_{ON_{MT}}$ time units, if NCR 130 is configured/indicated to monitor/transmit one or multiple contiguous and/or non-contiguous channel/signal from/to a wireless network, where the maximum gap between non-contiguous monitoring/transmissions (if any) is not more than $X_{gapON_{MT}}$. In an example, $X_{gapOFF_{MT}}=X_{gapON_{MT}}$.

If the same RF components or the same type of RF components are used for NCR-MT 133 and NCR-Fwd 135 at backhaul link 125, NCR 130 may autonomously set On-Off-states of NCR-Fwd 135 and the NCR-MT-133 to be the same. In some embodiments, NCR 130 can autonomously turn OFF both NCR-MT 133 and NCR-Fwd 135 function/component for $Y_{OFF_{MT\text{-}Fwd}}$ time units, if there is a duration of at least $X_{gapOFF_{MT\text{-}Fwd}}$ time units for which the NCR-MT 133 is not configured/indicated to monitor/transmit any channel/signal from/to the network and NCR-Fwd 135 is not configured/indicated to receive/forward any channel/signal from/to network, where $X_{gapOFF_{MT\text{-}Fwd}}>=Y_{OFF_{MT\text{-}Fwd}}$. In some embodiments, NCR 130 can autonomously turn ON the NCR-MT 133 and NCR-Fwd 135 function/component for $Y_{ON_{MT\text{-}Fwd}}$ time units, if NCR-MT 133 is configured/indicated to monitor/transmit one or multiple contiguous and/or non-contiguous channel/signal from/to network and if NCR-Fwd 135 is configured/indicated to receive/forward one or multiple contiguous and/or non-contiguous channel/signal from/to network, where the maximum gap between non-contiguous monitoring/transmissions (if any) is not more than $X_{gapON_{MT\text{-}Fwd}}$. In some embodiments, $X_{gapOFF_{MT\text{-}Fwd}}=X_{gapON_{MT\text{-}Fwd}}$.

In some examples, NCR 130 can turn OFF one or more of its corresponding components/functions (e.g., NCR-MT 133 and/or NCR-Fwd 135) after at least a gap $\Delta_{OFF}$ from the last transmission/reception, where the gap $\Delta_{OFF}$ can be either hard-coded and/or semi-statically configured and/or dynamically indicated (e.g., $X_{gapOFF}>=Y_{OFF}+\Delta_{OFF}$). This could be beneficial for taking into account any transient time and/or internal timing misalignment at NCR 130.

In some examples, NCR 130 can turn ON one or more of its corresponding components/functions(e.g., NCR-MT 133 and/or NCR-Fwd 135) before at least a gap A ON before the starting of a first transmission/reception, wherein the gap $\Delta_{ON}$ AON can be either hard-coded and/or semi-statically configured and/or dynamically indicated. This could be beneficial for taking into account any transient time and/or internal timing misalignment at NCR 130.

In some embodiments, the configuration/indication of scheduled forwarding/reception at NCR-Fwd 135 function/component (for access link 117 and/or backhaul link 125) can be implied by combination of configuration/indication of corresponding beams for NCR-Fwd 135 and the UL-DL TDD configuration. For example, when NCR 130 is configured with DL symbol/slot and a corresponding beam, then NCR 130 can turn OFF the RX chain for NCR-Fwd 135 at access link 117.

In some embodiments, NCR 130 can be configured to selectively turn ON or OFF NCR-MT 133 function depending on the scheduled transmission/reception or monitoring occasion (e.g., NCR-MT 133 is not required to turn ON for all of the PDCCH monitoring occasions (e.g., PDCCH monitoring periodicities.)

In some embodiments, NCR 130 can be configured by a wireless network (e.g., BS 120) to apply implicit and/or explicit ON-OFF procedures (e.g., set to On-state and/or Off-state.) In some examples, a single configuration is applied to NCR-MT 133, NCR-Fwd 135 at backhaul link 125 and NCR-Fwd 135 at access link 117. In some examples, a different configuration can be applied to NCR-MT 133, NCR-Fwd 135 at backhaul link 125 and NCR-Fwd 135 at access link 117.

Figure 6A:
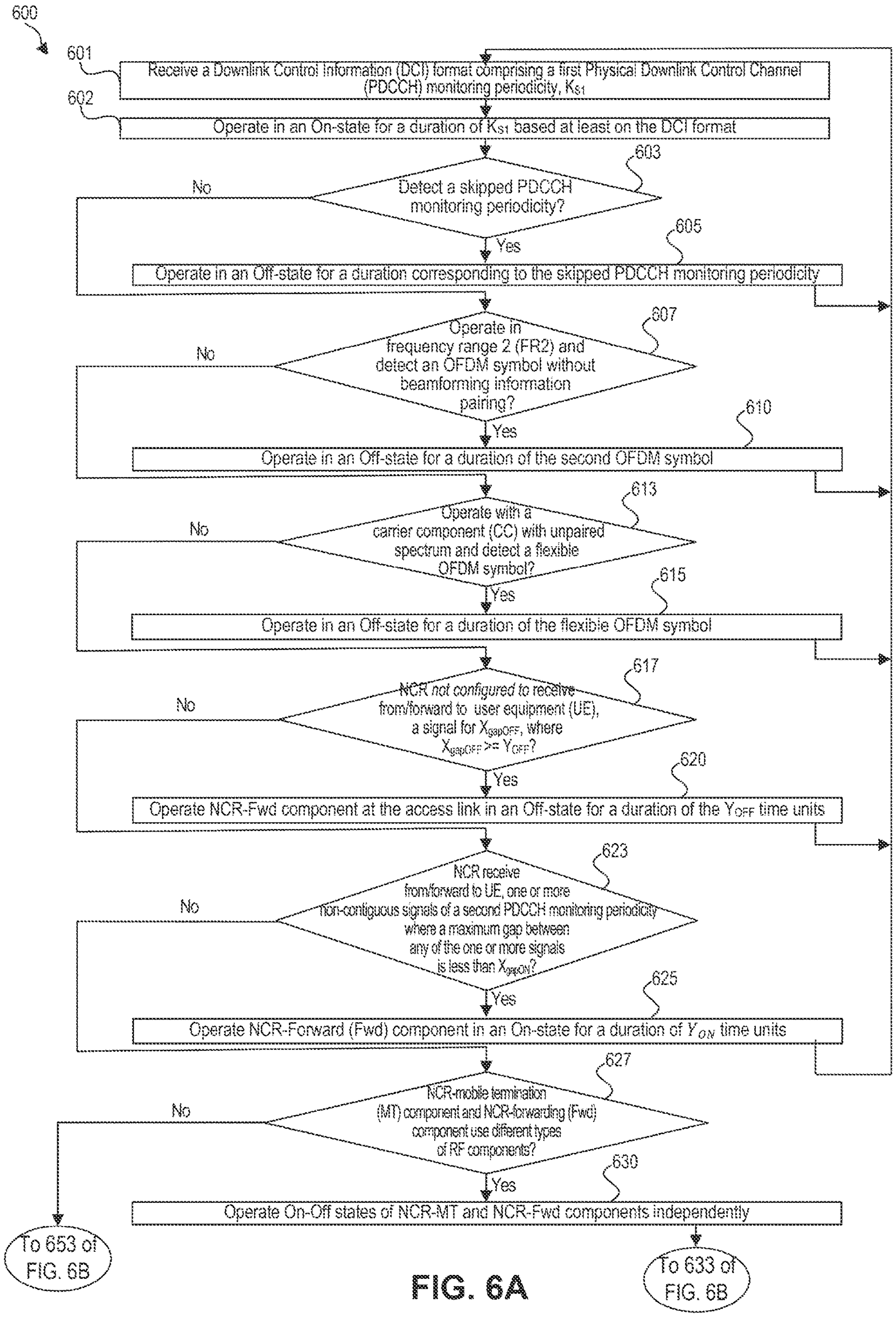
FIG. 6A illustrates an example method for an NCR supporting implicit power saving operations, according to some embodiments of the disclosure.

FIG. 6A illustrates example method 600 for an NCR supporting implicit power saving operations, according to some embodiments of the disclosure. For explanation purposes and not a limitation, FIG. 6A may be described with reference to elements from other figures within the disclosure. For example, portions of method 600 can be performed by NCR 130 that includes NCR-MT 133 and NCR-Fwd 135 of FIG. 1, or system 200 of FIG. 2.

At 601, system 200 can receive a Downlink Control Information (DCI) format including a first Physical Downlink Control Channel (PDCCH) monitoring periodicity, $K_{S1}$. For example, in FIG. 3, system 200 can receive DCI format 310*a* that identifies PDCCH monitoring periodicity, $K_S$ 340 as receiving and/or forwarding data in a signal.

At 602, system 200 can operate in an On-state for a duration of $K_S$ based at least on the DCI format. For example, FIG. 3 illustrates NCR-Fwd 135 operating in an On-state for an On-state 320*a* for duration of PDCCH monitoring periodicity, $K_S$ 340.

At 603, when system 200 detects a skipped PDCCH monitoring periodicity, method 600 proceeds to 605. For example, FIG. 3 illustrates NCR-MT 133 detecting that PDCCH monitoring periodicity, $K_S$ 342 is skipped (e.g., based at least on DCI format 310*b*). Otherwise, method 600 proceeds to 607.

At 605, system 200 operates in an Off-state for a duration corresponding to the skipped PDCCH monitoring periodicity. For example, FIG. 3 illustrates NCR-Fwd 135 operating in Off-state 320*b* for the duration of PDCCH monitoring periodicity, $K_S$ 342. Method 600 returns to 601.

At 607, when system 200 operates in frequency range 2 (FR2) and detects an OFDM symbol without beamforming information pairing, method 600 proceeds to 610. For example, when NCR-MT 133 determines that one or more OFDM symbols within a second PDCCH monitoring periodicity, $K_{S2}$ is not paired with beamforming information. Otherwise, method 600 proceeds to 613.

At 610, system 200 operates in an Off-state for a duration of the second OFDM symbol. NCR-MT 133 may implicitly determine that NCR-Fwd 135 should enter a sleep state or power saving state for a duration of the one or more OFDM symbols that are not paired with beamforming information. Method 600 returns to 601.

At 613, when system 200 operates with a carrier component (CC) with unpaired spectrum and detects a flexible (F) OFDM symbol, method 600 proceeds to 615. For example, FIG. 4 illustrates NCR-MT 133 detecting flexible (F) OFDM symbols 450 within slot 410 of PDCCH MO $K_S$ 420, and method 600 proceeds to 615. Otherwise, method 600 proceeds to 617.

At 615, system 200 operates in an Off-state for a duration of the flexible OFDM symbol. For example, FIG. 4 illustrates NCR-MT 133 causing NCR-Fwd 135 to enter a sleep or power saving state for a duration of flexible (F) OFDM symbols 450 shown as Off-state 473. Method 600 returns to 601.

At 617, when system 200 (e.g., NCR 130) is not configured to receive from or forward to user equipment (UE) 110, a signal for $X_{gapOFF}$, where $X_{gapOFF}>=Y_{OFF}$, method 600 proceeds to 620. For example, FIG. 5A illustrates NCR-MT 133 determining that Slot N+1 510 is not configured to receive and/or forward data to UE 110, where a duration of Slot N+1 510 is greater than or equal to $Y_{OFF}$. $Y_{OFF}$ time units can equal a time granularity at a symbol level or slot level for the time NCR 130 takes to turn off RF components (e.g., RF components of NCR-Fwd 135). In example 500, $X_{gapOFF}=Y_{OFF}$, and method 600 proceeds to 620. Otherwise, method 600 proceeds to 623.

At 620, system 200 operates NCR-Fwd 135 (e.g., component at access link 117) in an Off-state for a duration of the $Y_{OFF}$ time units. In example, 500, NCR-MT 133 can cause NCR-Fwd 135 to operate in an Off-state for a duration shown as OFF period 520*b*. Method 600 returns to 601.

At 623, when system 200 (e.g., NCR 130) receives from or forwards to UE 110, one or more non-contiguous signals of a second PDCCH monitoring periodicity where a maximum gap between any of the one or more signals is less than $X_{gapON}$, method 600 proceeds to 625. For example, in FIG. 5B, system 200 can determine that one or more non-contiguous signals of Slot N+1 570 includes gaps 572 and gaps 573 that are less than $X_{gapON}$ (e.g., $X_{gapON}=4$ OFDM symbols); method 600 proceeds to 625. Otherwise, method 600 proceeds to 627.

At 625, system 200 operates NCR-Forward (Fwd) 135 (e.g., component) in an On-state for a duration of $Y_{ON}$ time units of the second PDCCH monitoring periodicity. In FIG. 5B, for example, $Y_{ON}=14$ OFDM symbols, and system 200 can operate NCR-Fwd 135 in an On-state for $Y_{ON}=14$ OFDM symbols shown as ON period 580*b*. Method 600 returns to 601.

At 627, when system 200 determines that NCR-mobile termination (MT) 133 and NCR-Fwd 135 use different types of RF components, method 600 proceeds to 630. When system 200 determines that NCR-MT 133 uses cellular (e.g., 3GPP New Radio (NR)) and NCR-Fwd 135 uses cellular (e.g., Long Term Evolution (LTE)) and/or WiFi components, for example, method 600 proceeds to 630. Otherwise, method 600 proceeds to 653 of FIG. 6B.

At 630, system 200 operates On-Off states of NCR-MT 133 and NCR-Fwd 135 components independently. For example, NCR-MT 133 components may operate in an On-state while NCR-Fwd 135 components may operate in an Off-state. Method 600 proceeds to 633 of FIG. 6B.

Figure 6B:
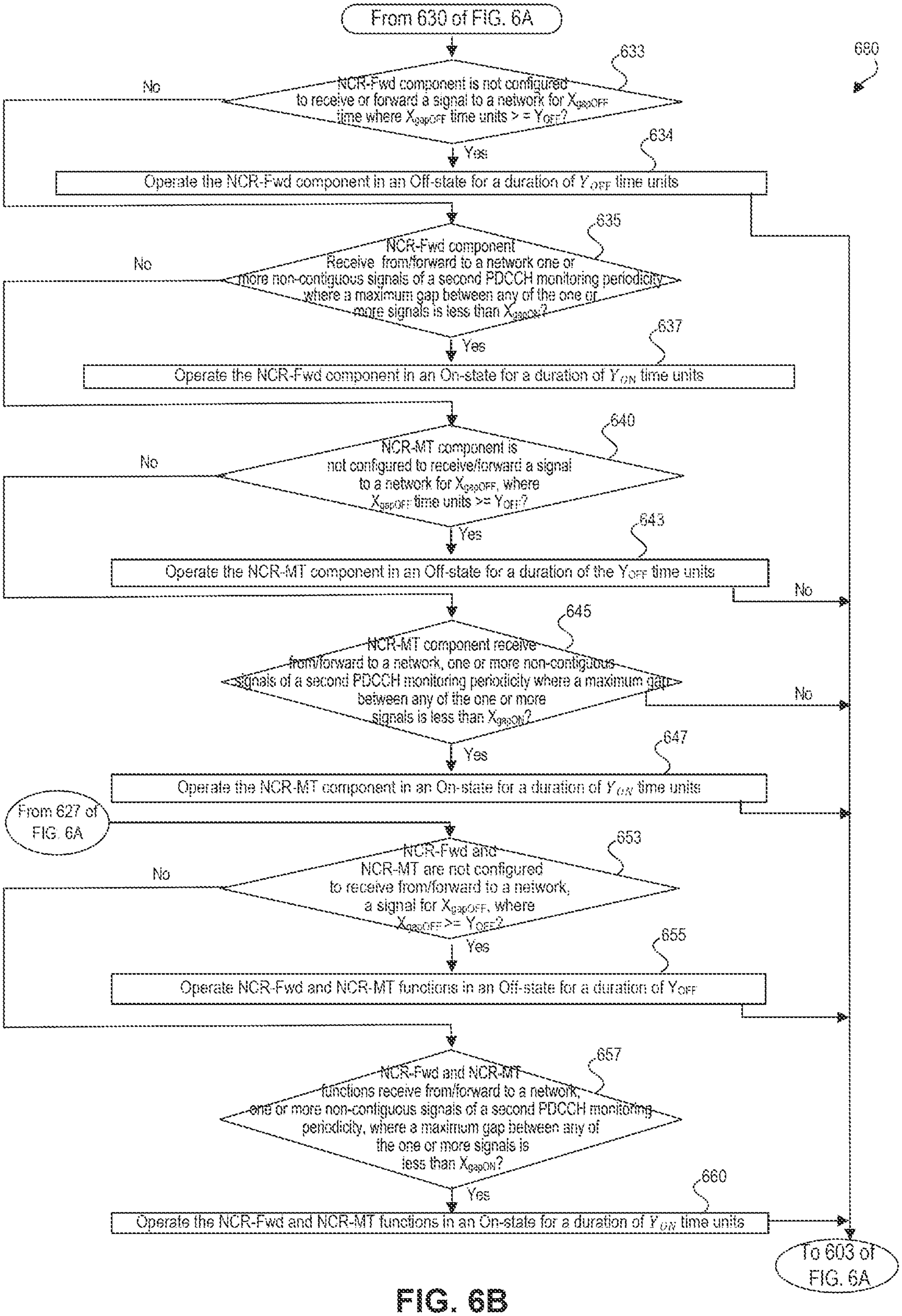
FIG. 6B illustrates another example method for an NCR supporting implicit power saving operations, according to some embodiments of the disclosure.

FIG. 6B illustrates another example method 680 for an NCR supporting implicit power saving operations, according to some embodiments of the disclosure. For explanation purposes and not a limitation, FIG. 6B may be described with reference to elements from other figures within the disclosure. For example, portions of method 600 can be performed by NCR 130 that includes NCR-MT 133 and NCR-Fwd 135 of FIG. 1, or system 200 of FIG. 2.

At 633, (e.g., from portions of FIG. 6A) when system 200 determines that NCR-Fwd 135 is not configured to receive or forward a signal to a network for $X_{gapOFF}$ time units, where $X_{gapOFF}$ time units>=$Y_{OFF}$ time units, (see FIG. 5A), method 600 proceeds to 634. Otherwise, method 600 proceeds to 635.

At 634, system 200 operates the NCR-Fwd component in an Off-state for a duration of the $Y_{OFF}$ time units (see FIG. 5A). Method 600 returns to 601 of FIG. 6A.

At 635, when system 200 determines that NCR-Fwd 135 receives from/forward to a network one or more non-contiguous signals of a second PDCCH monitoring periodicity where a maximum gap between any of the one or more signals is less than $X_{gapON}$ (see FIG. 5B) method 600 proceeds to 637. Otherwise, method 600 proceeds to 640.

At 637, system 200 operates NCR-Fwd 135 in an On-state for a duration of $Y_{ON}$ time units of the second PDCCH monitoring periodicity (see FIG. 5B). Method 600 returns to 601 of FIG. 6A.

At 640, when system 200 determines that NCR-MT 133 is not configured to receive/forward a signal to a network for $X_{gapOFF}$ time units, where $X_{gapOFF}$ time units>=$Y_{OFF}$ (see FIG. 5A) method 600 proceeds to 643. Otherwise, method 600 proceeds to 645.

At 643, system 200 operates NCR-MT 133 in an Off-state for a duration of the $Y_{OFF}$ time units (see FIG. 5A). Method 600 returns to 601 of FIG. 6A.

At 645, when system 200 determines that NCR-MT 133 receives from/forward to a network, one or more non-contiguous signals of a second PDCCH monitoring periodicity where a maximum gap between any of the one or more signals is less than $X_{gapON}$ (see FIG. 5B) method 600 proceeds to 647. Otherwise, method 600 returns to 601.

At 647, system 200 operates the NCR-MT component in an On-state for a duration of $Y_{ON}$ time units of the second PDCCH monitoring periodicity (see FIG. 5B). Method 600 returns to 601 of FIG. 6A.

At 653, (e.g., from 627 of FIG. 6A) system 200 NCR-MT 133 and NCR-Fwd 135 use same type of RF component. When system 200 determines that NCR-Fwd 135 and NCR-MT 133 are not configured to receive from/forward to a network, a signal for $X_{gapOFF}$ time units, where $X_{gapOFF}$>=$Y_{OFF}$ time units (see FIG. 5A), method 600 proceeds to 655. Otherwise, method 600 proceeds to 657.

At 655, system 200 operates NCR-Fwd 135 and NCR-MT 133 in an Off-state for a duration of $Y_{OFF}$ (see FIG. 5A). Method 600 returns to 601 of FIG. 6A.

At 657, when system 200 determines that NCR-Fwd 135 and NCR-MT 133 receive from/forward to a network, one or more non-contiguous signals of a second PDCCH monitoring periodicity, where a maximum gap between any of the one or more signals is less than $X_{gapON}$ (see FIG. 5B), method 600 proceeds to 660. Otherwise, method 600 returns to 601 of FIG. 6A.

At 660, system 200 operates NCR-Fwd 135 and NCR-MT 133 in an On-state for a duration of $Y_{ON}$ time units of the second PDCCH monitoring periodicity (see FIG. 5B). Method 600 returns to 601 of FIG. 6A.

Figure 7:
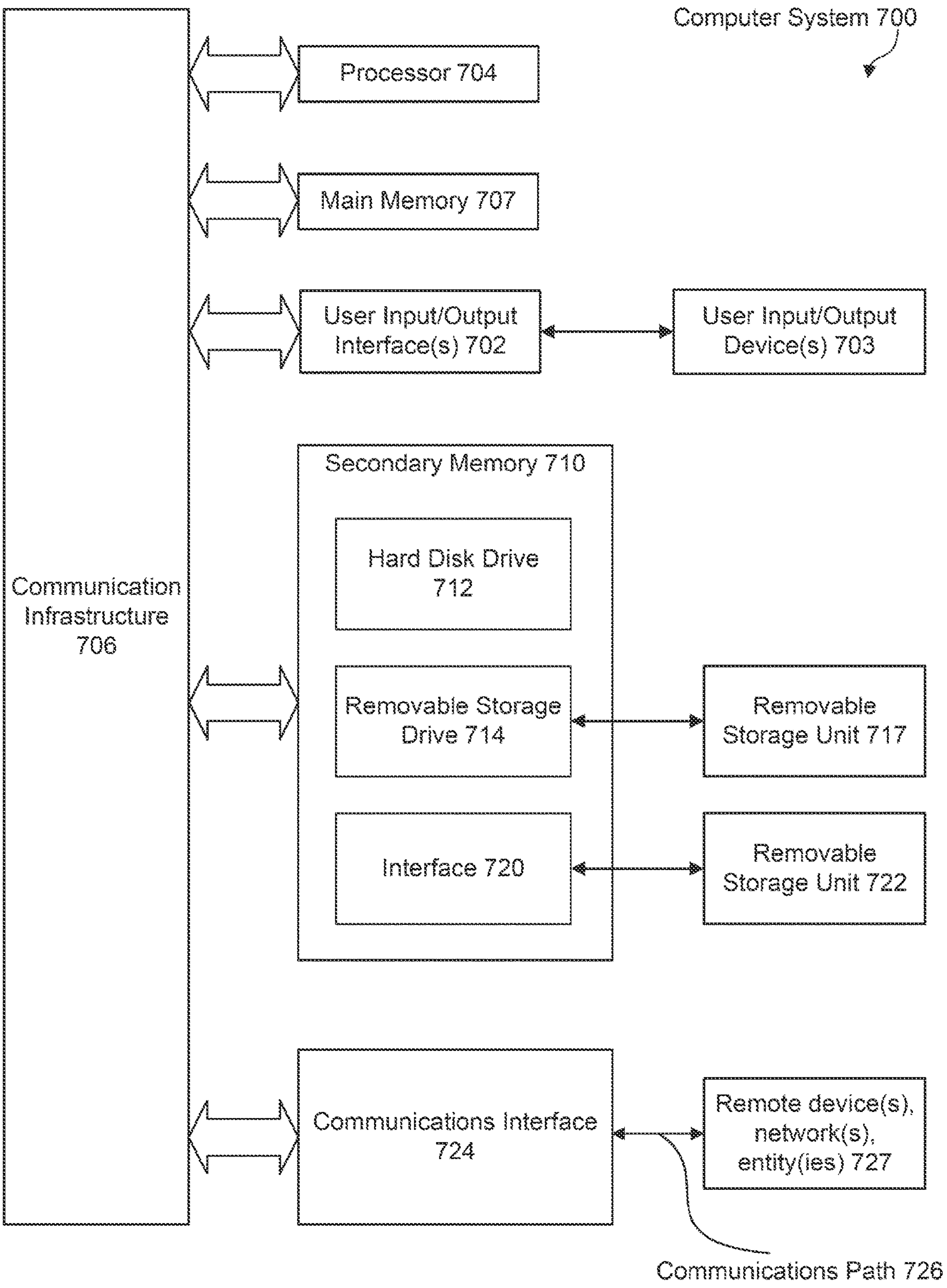
FIG. 7 is an example computer system for implementing some embodiments or portion(s) thereof.

Various embodiments can be implemented, for example, using one or more well-known computer systems, such as computer system 700 shown in FIG. 7. Computer system 700 can be any well-known computer capable of performing the functions described herein. For example, and without limitation, BS 120, NCR 130, and/or UE 110 of FIG. 1, system 200 of FIG. 2, examples of FIGS. 3, 4, 5A, 5B, and methods 600 and 680 of FIGS. 6A and 6B (and/or other apparatuses and/or components shown in the figures) may be implemented using computer system 700, or portions thereof.

Computer system 700 includes one or more processors (also called central processing units, or CPUs), such as a processor 704. Processor 704 is connected to a communication infrastructure 706 that can be a bus. One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some embodiments, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A network-controlled repeater (NCR) comprising:

a memory; and a processor coupled to the memory;

an NCR-mobile termination (MT) component; and an NCR-forwarding (Fwd) component, wherein the NCR-MT component and the NCR-Fwd component are communicatively coupled to the processor, wherein the NCR-MT component at a control link uses a different radio frequency (RF) component than the NCR-Fwd component at a backhaul link, and wherein the processor is configured to:

operate an On-Off state of the NCR-MT component at the control link independently from an On-Off state of the NCR-Fwd component at the backhaul link, based at least on the different RF component;

receive a Downlink Control Information (DCI) format comprising a first Physical Downlink Control Channel (PDCCH) monitoring periodicity, $K_{S1}$, comprising an integer number of slots;

operate in an On-state for a duration of $K_{S1}$ based at least on the DCI format;

detect a skipped PDCCH monitoring periodicity subsequent to $K_{S1}$; and operate in an Off-state for a duration corresponding to the skipped PDCCH monitoring periodicity.

2. The NCR of claim 1, wherein the NCR operates in frequency range 2 (FR2) and a first orthogonal frequency division multiplexing (OFDM) symbol paired with beamforming information corresponds to an On-state for a duration of the first OFDM symbol within a second PDCCH monitoring periodicity, $K_{S2}$, and wherein the processor is further configured to:

detect a second OFDM symbol without the beamforming information pairing in the second PDCCH monitoring periodicity, $K_{S2}$; and operate in an Off-state for a duration of the second OFDM symbol.

3. The NCR of claim 1, wherein the NCR operates with a carrier component (CC) with unpaired spectrum and supports slot configurations time division duplex (tdd)-uplink (UL)-downlink (DL)-ConfigurationCommon or tdd-UL-DL-ConfigurationDedicated, and wherein the processor is further configured to:

detect from a System Information Block (SIB) associated with a second PDCCH monitoring periodicity, $K_{S2}$, a flexible orthogonal frequency division multiplexing (OFDM) symbol; and operate in an Off-state for a duration of the flexible OFDM symbol.

4. The NCR of claim 1, wherein the processor is further configured to:

determine that the NCR is not configured to receive from or forward to a user equipment (UE), a signal for time units, $X_{gapOFF}$, wherein the $X_{gapOFF}$>=$Y_{OFF}$, where $Y_{OFF}$ corresponds to time units for turning off the NCR-Fwd component of the NCR at an access link communicatively coupled to the UE; and operate the NCR-Fwd component at the access link in an Off-state for a duration of $Y_{OFF}$, based at least on the determination.

5. The NCR of claim 1, wherein the processor is further configured to:

determine that the NCR is configured to receive from or forward to a user equipment (UE), one or more non-contiguous signals in a second PDCCH monitoring periodicity, $K_{S2}$, wherein a maximum gap between any of the one or more non-contiguous signals is less than time units, $X_{gapON}$; and operate the NCR-Fwd component of the NCR at an access link communicatively coupled to the UE, in an On-state for a duration of $Y_{ON}$ of $K_{S2}$.

6. The NCR of claim 5, wherein $X_{gapOFF}$, represents time units when the NCR is not configured to receive or forward a signal to the UE, wherein a threshold, $X_{gapON}$ equals $X_{gapOFF}$.

7. The NCR of claim 1, wherein the processor is further configured to:

determine that the NCR-Fwd component is not configured to receive or forward a signal to a network for time units, $X_{gapOFF}$, wherein $X_{gapOFF}$>=$Y_{OFF}$, where $Y_{OFF}$ corresponds to time units for turning off the NCR-Fwd component communicatively coupled to the network; and operate the NCR-Fwd component at the backhaul link in an Off-state for a duration of $Y_{OFF}$ based at least on the determination.

8. The NCR of claim 1, wherein the processor is further configured to:

determine that the NCR-Fwd component is configured to receive from, or forward to a network via the backhaul link, one or more non-contiguous signals in a second PDCCH monitoring periodicity, $K_{S2}$, wherein a maximum gap between any of the one or more non-contiguous signals is less than time units, $X_{gapON}$; and operate the NCR-Fwd component at the backhaul link in an On-state for a duration of $Y_{ON}$ of $K_{S2}$, based at least on the determination.

9. The NCR of claim 1, wherein the processor is further configured to:

determine that the NCR-MT component is not configured to receive or forward a signal to a network for time units, $X_{gapOFF}$, wherein $X_{gapOFF}$>=$Y_{OFF}$, where $Y_{OFF}$ corresponds to time units for turning off the NCR-MT component communicatively coupled to the network; and operate the NCR-MT component at the control link in an Off-state for a duration of $Y_{OFF}$, based at least on the determination.

10. The NCR of claim 1, wherein the processor is further configured to:

determine that the NCR-MT component is configured to receive from, or forward to a network via the control link, one or more non-contiguous signals in a second PDCCH monitoring periodicity, $K_{S2}$, wherein a maximum gap between any of the one or more non-contiguous signals is less than time units, $X_{gapON}$; and operate the NCR-MT component at the control link in an On-state for a duration of $Y_{ON}$ of $K_{S2}$, based at least on the determination.

11. A method for operating a network-controlled repeater (NCR) that includes an NCR-mobile termination (MT) component and an NCR-forwarding (Fwd) component, wherein the NCR-MT component at a control link uses a different radio frequency (RF) component than the NCR-Fwd component at a backhaul link, the method comprising:

operating an On-Off state of the NCR-MT component at the control link independently from an On-Off state of the NCR-Fwd component at the backhaul link, based at least on the different RF component;

receiving a Downlink Control Information (DCI) format comprising a first Physical Downlink Control Channel (PDCCH) monitoring periodicity, $K_{S1}$, comprising an integer number of slots;

operating in an On-state for a duration of $K_{S1}$ based at least on the DCI format;

detecting a skipped PDCCH monitoring periodicity subsequent to $K_{S1}$; and operating in an Off-state for a duration corresponding to the skipped PDCCH monitoring periodicity.

12. The method of claim 11, further comprising:

determining that the NCR-Fwd component is not configured to receive or forward a signal to a network for time units, $X_{gapOFF}$, wherein $X_{gapOFF}$>=$Y_{OFF}$, where $Y_{OFF}$ corresponds to time units for turning off the NCR-Fwd component communicatively coupled to the network; and operating the NCR-Fwd component at the backhaul link in an Off-state for a duration of $Y_{OFF}$ based at least on the determination.

13. The method of claim 11, further comprising:

determining that the NCR-Fwd component is configured to receive from, or forward to a network via the backhaul link, one or more non-contiguous signals in a second PDCCH monitoring periodicity, $K_{S2}$, wherein a maximum gap between any of the one or more non-continguous signals is less than time units, $X_{gapON}$; and operating the NCR-Fwd component at the backhaul link in an On-state for a duration of $Y_{ON}$ of $K_{S2}$, based at least on the determination.

14. The method of claim 11, further comprising:

determining that the NCR-MT component is not configured to receive or forward a signal to a network for time units, $X_{gapOFF}$, wherein $X_{gapOFF}>=Y_{OFF}$, where $Y_{OFF}$ corresponds to time units for turning off the NCR-MT component communicatively coupled to the network; and operating the NCR-MT component at the control link in an Off-state for a duration of $Y_{OFF}$, based at least on the determination.

15. The method of claim 11, further comprising:

determining that the NCR-MT component is configured to receive from, or forward to a network via the control link, one or more non-contiguous signals in a second PDCCH monitoring periodicity, $K_{S2}$, wherein a maximum gap between any of the one or more non-contiguous signals is less than time units, $X_{gapON}$; and operating the NCR-MT component at the control link in an On-state for a duration of $Y_{ON}$ of $K_{S2}$, based at least on the determination.

16. A non-transitory computer-readable medium storing instructions that, when executed by a processor of a network-controlled repeater (NCR) that includes an NCR-mobile termination (MT) component and an NCR-forwarding (Fwd) component, wherein the NCR-MT component at a control link uses a different radio frequency (RF) component than the NCR-Fwd component at a backhaul link, causes the NCR to perform operations, the operations comprising:

operating an On-Off state of the NCR-MT component at the control link independently from an On-Off state of the NCR-Fwd component at the backhaul link, based at least on the different RF component;

receiving a Downlink Control Information (DCI) format comprising a first Physical Downlink Control Channel (PDCCH) monitoring periodicity, $K_{S1}$, comprising an integer number of slots;

operating in an On-state for a duration of $K_{S1}$ based at least on the DCI format;

detecting a skipped PDCCH monitoring periodicity subsequent to $K_{S1}$; and operating in an Off-state for a duration corresponding to the skipped PDCCH monitoring periodicity.

17. The non-transitory computer-readable medium of claim 16, wherein the NCR operates in frequency range 2 (FR2) and a first orthogonal frequency division multiplexing (OFDM) symbol paired with beamforming information corresponds to an On-state for a duration of the first OFDM symbol within a second PDCCH monitoring periodicity, $K_{S2}$, the operations further comprise:

detecting a second OFDM symbol without the beamforming information pairing in the second PDCCH monitoring periodicity, $K_{S2}$; and operating in an Off-state for a duration of the second OFDM symbol.

18. The non-transitory computer-readable medium of claim 16, wherein the NCR operates with a carrier component (CC) with unpaired spectrum and supports slot configurations time division duplex (tdd)-uplink (UL)-downlink (DL)-ConfigurationCommon or tdd-UL-DLConfiguration-Dedicated, the operations further comprise:

detecting from a System Information Block (SIB) associated with a second PDCCH monitoring periodicity, $K_{S2}$, a flexible orthogonal frequency division multiplexing (OFDM) symbol; and operating in an Off-state for a duration of the flexible OFDM symbol.

19. The non-transitory computer-readable medium of claim 16, wherein the operations further comprise:

determining that the NCR-Fwd component is not configured to receive or forward a signal to a network for time units, $X_{gapOFF}$, wherein $X_{gapOFF}>=Y_{OFF}$, where $Y_{OFF}$ corresponds to time units for turning off the NCR-Fwd component communicatively coupled to the network; and operating the NCR-Fwd component at the backhaul link in an Off-state for a duration of $Y_{OFF}$ based at least on the determination.

20. The non-transitory computer-readable medium of claim 16, wherein the operations further comprise:

determining that the NCR-Fwd component is configured to receive from, or forward to a network via the backhaul link, one or more non-contiguous signals in a second PDCCH monitoring periodicity, $K_{S2}$, wherein a maximum gap between any of the one or more non-continguous signals is less than time units, $X_{gapON}$; and operating the NCR-Fwd component at the backhaul link in an On-state for a duration of $Y_{ON}$ of $K_{S2}$, based at least on the determination.

* * * * *